Sept. 27, 1927.  J. P. RATIGAN  1,643,587
CONNECTER
Filed Dec. 11, 1926
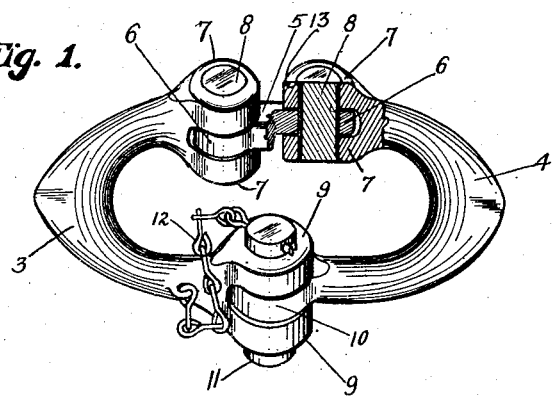
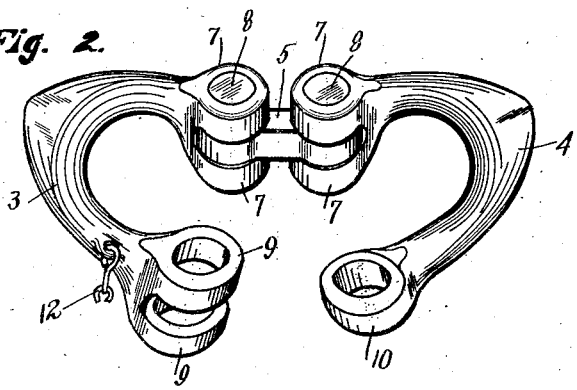
INVENTOR.
JAMES P. RATIGAN.
BY
ATTORNEYS.

Patented Sept. 27, 1927.

1,643,587

UNITED STATES PATENT OFFICE.

JAMES P. RATIGAN, OF WALNUT PARK, CALIFORNIA.

CONNECTER.

Application filed December 11, 1926. Serial No. 154,264.

This invention relates to connecters of the type employed, for example, as a portion of the construction employed in connecting a walking beam to the polish rod of a pump, or it may be used where it is desired to releasably connect two members provided with eyes.

A device similar to this, now in use, is termed a C-hook and the present invention can be substituted for such C-hook. When a C-hook is sprung by over-straining it is difficult to remove and replace the pin that releasably connects the two members of the C-hook, and an object of this invention is to avoid this difficulty.

In the preferred embodiment of the invention the arrangement of the links is such that if any of the links are sprung, so as to tend to move the pin bearings of any particular pair of cooperating pin bearings out of registration, they can be readily registered by slight relative swinging of the links about the pivots.

The accompanying drawings illustrate the invention.

Figure 1 is a perspective view, partly in section, of a connecter constructed in accordance with the provisions of this invention, the parts being in the positions they occupy when the connecter is closed.

Figure 2 is a perspective view of the connecter with the parts in the positions they occupy when the connecter is open.

There are provided two U-shaped end links 3, 4 which are pivotally connected in any suitable manner. Preferably, there is a flat intermediate link 5 provided at its opposite ends with pin bearings 6 and the links 3, 4 are provided at one end with spaced pin bearings 7. In each set of bearings 6, 7 is positioned a pin 8. The pins 8 are headed over at each end, as indicated at 13. so as to permanently position said pins in the bearings.

At its opposite end the link 3 is provided with spaced pin bearings 9 adapted to receive between them a pin bearing 10 at one end of the link 4. Removably engaging the pin bearings 9, 10 is a pin 11 which is removable from said bearings. Preferably the pin 11 is connected by a flexible member 12 to one of the end links, the link 3 in this instance, so that when said pin is removed from the bearings it cannot become lost.

To use the invention, the pin 11 will be removed and the links 3, 4 swung into the open position shown in Fig. 2. Then the cables or other members that are to be connected will be passed between the open ends of the links 3, 4 and said links will then be swung into position to register the bearings 9, 10 and the pin 11 will be replaced in said bearings.

It is to be noted that should an excessive strain result in bending the bearings 7 of one of the links 3, 4 toward the opposite end of said link, a slight adjustment of the link 5 will permit of the pin 11 being replaced in the bearings 9, 10 without any difficulty as said bearings 9, 10 can always readily be brought into alignment.

The pin 11 may be of any suitable construction and is preferably provided with suitable means, not shown, to prevent it dropping out of the associated bearings. Said pin 11 may be constructed, for example, as described in detail in my co-pending application for patent filed December 8, 1926, Ser. No. 153,444.

From the foregoing it will be understood that a feature of primary importance in the construction is the provision of the two U-shaped members, the means 5, 8 pivotally connecting one end of the U-shaped members, and the pin 11 detachably connecting the other ends of the U-shaped members. The added advantage of aligning the pin bearings is secured by the provision of the intermediate link 5.

I claim:

A connecter comprising U-shaped end links, a third link pivoted to one end of each of the end links, the other end of each of the end links provided with pin bearings, and a pin removably engaging the bearings.

Signed at Los Angeles, Calif., this 1st day of December, 1926.

JAMES P. RATIGAN.